United States Patent [19]
Cassimally et al.

[11] 4,411,343
[45] Oct. 25, 1983

[54] LUGGAGE TROLLEY

[75] Inventors: Khalil A. I. Cassimally, 403 Hayes Rd., Fort Pierce, Fla. 33450; Horace Frommelt, Fort Pierce, Fla.

[73] Assignee: Khalil Ahmid Ibrahim Cassimally, Fort Pierce, Fla.

[21] Appl. No.: 301,466

[22] Filed: Sep. 14, 1981

[51] Int. Cl.³ .................... B62B 1/12; A45C 5/14; A45C 13/28
[52] U.S. Cl. .................. 190/18 A; 190/115; 280/37
[58] Field of Search .............. 190/18 A, 57, 58 B; 16/115; 280/37

[56] References Cited

U.S. PATENT DOCUMENTS

| 1,028,178 | 6/1912 | Batchelor | 190/18 A X |
|---|---|---|---|
| 1,189,244 | 7/1916 | Erickson et al. | 280/37 |
| 1,576,501 | 3/1926 | Bibo | 280/37 |
| 2,463,713 | 2/1947 | Fartiot | 280/37 |
| 2,439,660 | 4/1948 | Keil | 190/18 A X |
| 2,472,491 | 6/1949 | Quinton | 280/37 |
| 2,562,686 | 7/1951 | Altemus | 280/38 |
| 2,581,417 | 1/1952 | Jones | 190/18 A X |
| 2,675,101 | 4/1954 | Bartlett | 190/57 |
| 2,733,076 | 1/1956 | Burnett | 280/652 |
| 3,842,953 | 10/1974 | Royet | 190/18 A |
| 3,891,230 | 6/1975 | Mayer | 190/18 A X |
| 3,917,038 | 11/1975 | Føge et al. | 190/18 A |
| Re. 28,757 | 4/1976 | Cassimally | 280/37 |
| 3,948,365 | 4/1976 | Gregg et al. | 190/18 A |
| 3,960,252 | 6/1976 | Cassimally | 190/18 A |
| Re. 29,036 | 11/1976 | Hager | 190/18 A |
| 3,988,802 | 11/1976 | Bruni et al. | 16/115 |
| 4,026,569 | 5/1977 | Staal | 190/18 A X |
| 4,036,336 | 7/1977 | Burtley | 190/18 A |
| 4,070,932 | 1/1978 | Jeannotte | 16/115 X |
| 4,254,850 | 3/1981 | Knowles | 190/18 A |

FOREIGN PATENT DOCUMENTS

| 141352 | 8/1949 | Australia | 190/18 A |
|---|---|---|---|
| 573486 | 6/1924 | France. | |
| 448094 | 6/1936 | France. | |
| 867582 | 11/1941 | France | 190/18 A |
| 51644 | 3/1943 | France | 190/18 A |
| 944684 | 4/1949 | France | 280/37 |
| 59346 | 5/1954 | France | 190/18 A |
| 1099200 | 1/1968 | Great Britain | 190/18 A |
| 1194851 | 6/1970 | Great Britain. | |

Primary Examiner—William Price
Assistant Examiner—Sue A. Weaver
Attorney, Agent, or Firm—Wood, Dalton, Phillips, Mason & Rowe

[57] ABSTRACT

A portable case having a mechanism capable of converting said case into a trolley. The mechanism is formed from basically two related sets of components, including base members connected to the sides of the case and each capable of extending a forward end beyond one end of the case, and a handle structure having arm members longitudinally slidable in relation to the base members and capable of being pivoted and locked at an angle with respect to the base members. In one embodiment, wheels are supported on the rear of the arm members so as to project downward therefrom when the arm members are pivoted and locked in their trolley position. In other embodiments, wheels are supported near the forward end of the base members. With both configurations, the wheels support the entire case when the locked arm members are tilted forward for trolley use.

31 Claims, 16 Drawing Figures

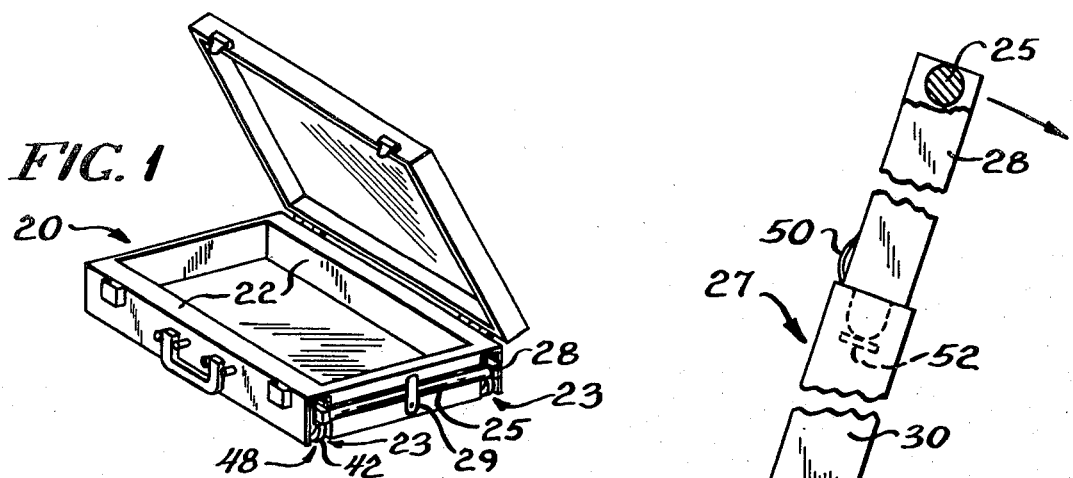
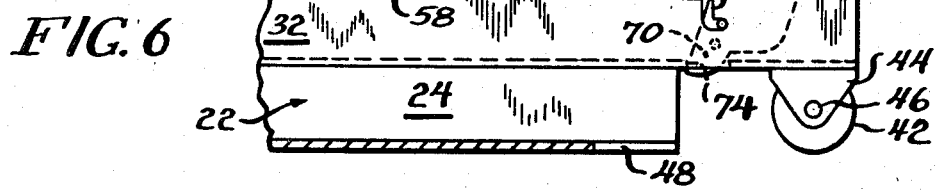
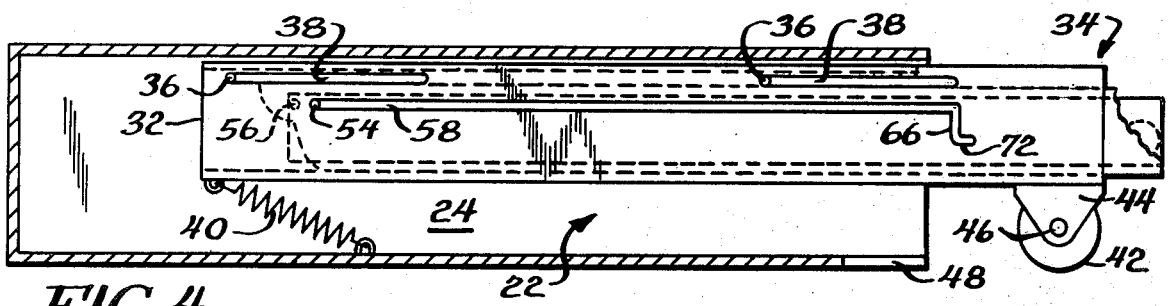
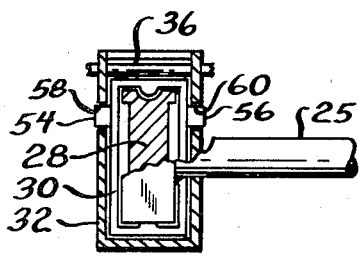
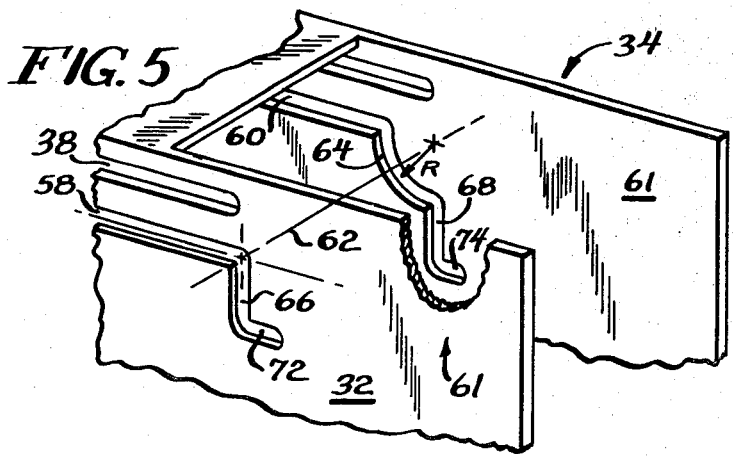
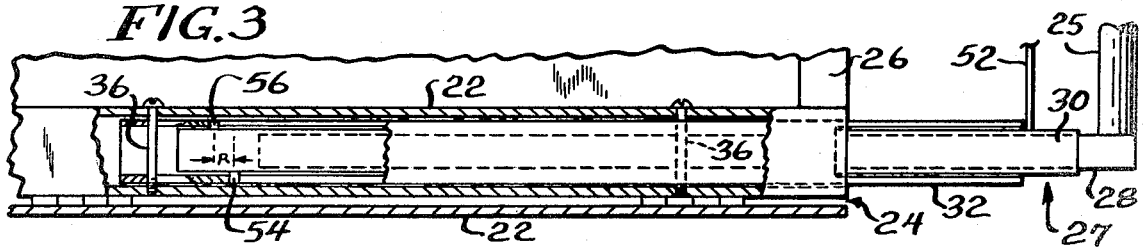

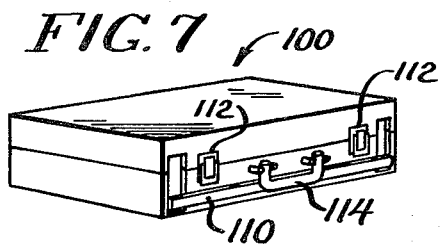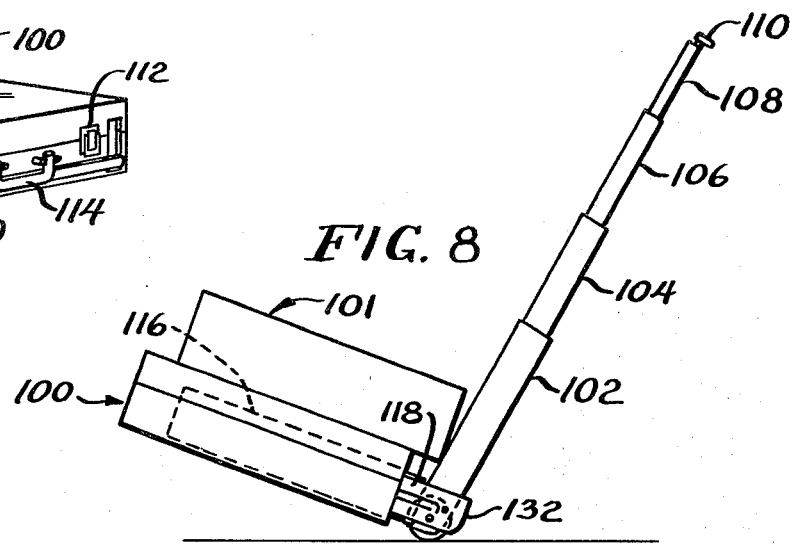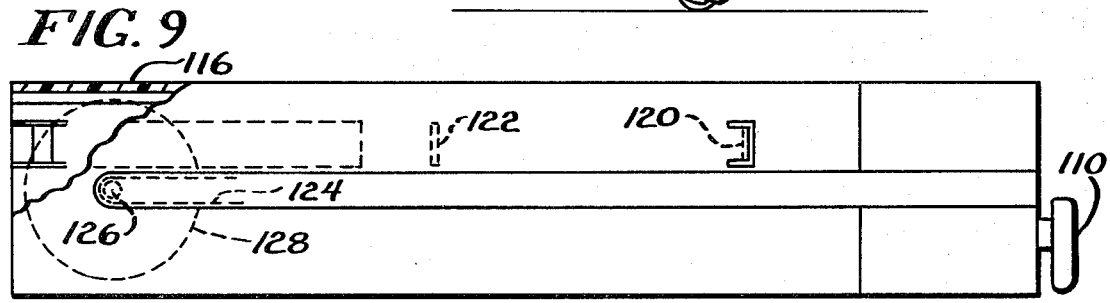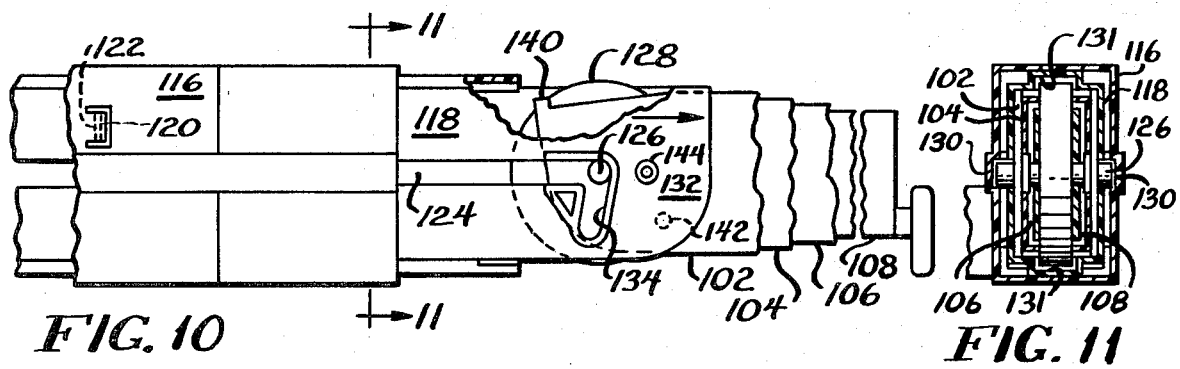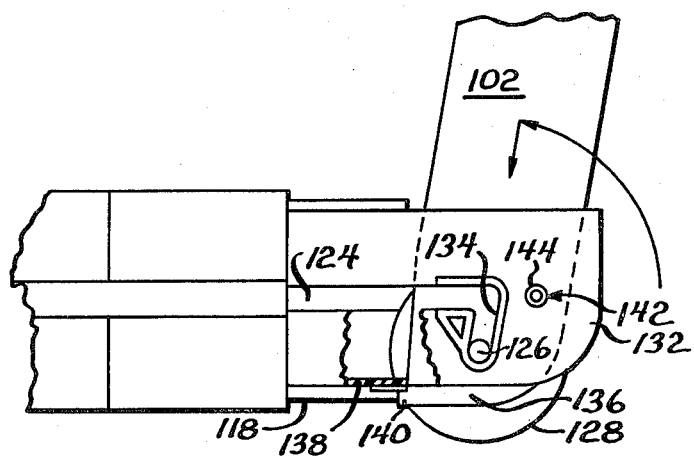

LUGGAGE TROLLEY

BACKGROUND ART

1. Field of the Invention

This invention relates generally to luggage trolleys and more particularly to portable cases having mechanisms capable of converting said cases into trolleys.

2. Description of the Prior Art

Luggage trolleys are well known in the art for use by travelers to conveniently transport several luggage pieces together. These trolleys are essentially wheeled carts which may be tipped forward to hold luggage on the cart and are pulled by a handle. However, these trolleys are entirely separate from the luggage pieces and thus are themselves additional pieces of luggage which must be taken care of. Such an additional piece can, of course, become very inconvenient.

Some pieces of luggage in the prior art have been provided with wheels and an additional handle to ease transport of that piece. These pieces of luggage have had wheels at one end of the luggage with a handle extendible, by either folding or telescoping, from the other end. Although these types of luggage are convenient for a traveler to pull behind him that piece of luggage and possibly one other light piece of luggage strapped thereto, they are not readily capable of supporting other large pieces of luggage or numerous pieces of luggage for transportation therewith.

I have in my own prior patents (Re. 28,757, issued Apr. 6, 1976, and U.S. Pat. No. 3,960,252, issued June 1, 1976) disclosed two different types of cases having a handle and wheels which may be used to convert a piece of luggage into a trolley for additional pieces of luggage. Both of these patents include handles which are folded out for use as a trolley. It is necessary for these two mechanisms to be mounted on the outside of the case, resulting in an unattractive appearance and/or a relatively bulky mechanism which results in a reduced interior volume of the case.

This invention is directed to overcoming one or more of the problems as set forth above.

SUMMARY OF THE INVENTION

A portable case is disclosed having a mechanism capable of converting said case into a trolley. The mechanism is formed from basically two related sets of components, including base members connected to the sides of the case and each capable of extending a forward end beyond one end of the case, and a handle structure having arm members longitudinally slidable in relation to the base members and capable of being pivoted and locked at an angle with respect to the base members. In one embodiment, wheels are supported on the rear of the arm members so as to project downward therefrom when the arm members are pivoted and locked in their trolley position. In other embodiments, wheels are supported near the forward end of the base members. With both configurations, the wheels support the entire case when the locked arm members are tilted forward for trolley use.

This mechanism is lightweight, occupies a minimum amount of volume, and yet is sturdy enough to support a large number of additional luggage pieces when used as a trolley. Because of the small volume of the mechanism, the interior of the case is reduced only a minimal amount, thereby leaving the desired maximum amount of interior volume for clothes or papers or the like.

The construction for locking the arm members with respect to the base members is another novel feature disclosed herein. Each arm member is telescopically received within a base member which is provided with flanges extending forwardly from its sides. At least one side of the base member has a longitudinal slot extending substantially its entire length and ending in the flange at the forward end and the arm member includes a pin on one side which is received in and slides in the longitudinal slot. At the forward end of the longitudinal slot there is provided a downwardly extending slot. When the arm member has fully extended so that its pin is at the forward end of the longitudinal slot, the arm member may be pivoted upward around the pin to the trolley position. The arm member may then be moved down with the pin sliding in the downwardly extending slot. This downward movement is sufficient to lower the end of the arm member into engagement with the bottom of the base member, thereby locking the arm member against pivoting when the arms are tilted to raise the case for transport as a trolley. An alternative construction for locking the arm member at an angle in its trolley position is to include a locking mechanism on the end of the case which can be secured to the arm member when said arm member is pivoted upward to its trolley position. With either of these constructions, the mechanism may be easily converted into its trolley position in a matter of seconds.

Still another novel feature disclosed herein is a spring used to bias the base member toward ts outwardly extending trolley position. A lock or latch is provided to hold the mechanism within the case against this biasing force but, when the latch is released, the mechanism will spring forward, permitting the case to be easily converted to a trolley by merely pulling on the handle and pivoting the arms upwardly.

BRIEF DESCRIPTION OF THE DRAWINGS

FIGS. 1-6 illustrate one embodiment of the invention where:

FIG. 1 is a perspective view of the portable case when opened;

FIG. 2 is a partially broken cross-sectional view of the telescoping arm mechanism;

FIG. 3 is a plan view of one-half of the telescoping arm mechanism;

FIG. 4 is a cross-sectional outside view of one arm of the mechanism;

FIG. 5 is an enlarged perspective view showing the detail of the slots within the base member; and FIG. 6 is a partial cross-sectional view showing the arm mechanism as extended to its trolley position.

FIGS. 7-12 illustrate a second embodiment of the invention where:

FIG. 7 is a perspective view of the portable case;

FIG. 8 is a side view of the case as it appears when extended to its trolley position and showing an additional luggage piece stacked thereon for transport;

FIG. 9 is a partially broken view of the side of the case with the mechanism stored therein;

FIG. 10 is a partial side view of the case showing the mechanism as extended before conversion to the trolley position;

FIG. 11 is a cross-sectional view taken along line 11-11 in FIG. 10; and

FIG. 12 is a partial side view showing the arms locked upward in the trolley position.

FIG. 13 is a perspective view of the portable case;

FIG. 14 is a partial plan view showing one side of the trolley mechanism with the arms extended;

FIG. 15 is a partial cross-sectional view showing detail of the trolley arm locking construction; and FIG. 16 is a partially broken view showing the case in its trolley position.

DESCRIPTION OF THE PREFERRED EMBODIMENTS

Figure 13:
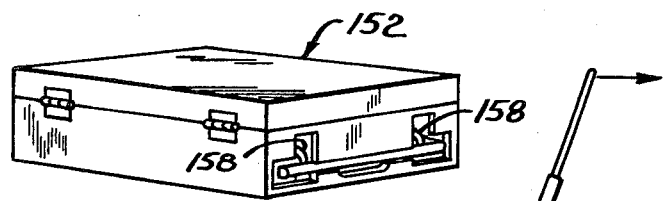
FIGS. 13-16 illustrate a third embodiment of the invention where.

One embodiment of the portable luggage having a mechanism for converting it into a trolley is shown in FIG. 1. The luggage may be of any type desired, such as an overnight case for clothes or a briefcase for papers. The trolley mechanism is easily adaptable for use with any of these cases. The case should be suitably reinforced in order to withstand the weight of other luggage piled on top of it. The case should also preferably be made of scuff resistant material, particularly the side of the case which faces the ground when used as a trolley.

The portable case 20 shown in FIG. 1 has longitudinal housings 22 on opposite sides of the case, which housings 22 enclose the trolley mechanism. The housings 22 have openings 23 at one end of the case 20 from which the trolley mechanism may be extended. The channels 24 defined by the housings 22 are weathertight except at the openings 23 to prevent rain and other elements from passing through the openings 23 and into the inside of the case 20.

A handle 25 extends between and connects the two sides of the trolley mechanism. Preferably, the case 20 should have an indentation 26 (see FIG. 3) at that end in which the handle 25 may fit to form a flush end, thereby ensuring that the handle 25 does not catch on anything when in its storage position. It is also desirable to have a suitable lock or latch 29 for holding the handle 25 in its flush (storage) position when the case 20 is in normal use.

The telescoping arms 27, which enable the case 20 to be converted to a trolley operation, are shown in detail in FIGS. 2-6. This is only one construction which may be used and other embodiments are described in detail further below. Further, although the specification and figures center on telescoping arms, other equivalent structures, such as side by side sliding arm members, may be used. Note that in the discussion below, reference is made to only one telescoping arm 27 (i.e. only one side of the mechanism) but it should be understood that the telescoping arm 27 on the other side would have the same construction.

With the telescoping arms 27 mounted to the long sides of the case 20, sufficient arm length for convenient trolley operation may be provided for some cases with a telescoping upper arm member 28 and a telescoping lower arm member 30 nesting within a base member 32. Intermediate arm members may be provided where greater overall arm lengths are desired. The upper and lower arm members 28,30 may be telescoped into and out of the base member 32 as described in greater detail further below.

The base member 32 is mounted by suitable means to reciprocate its forward end 34 into and out of the housing 22 and, together with the handle structure (comprising the handle 25 and telescoping arms 27), define the essential components of the trolley mechanism.

One suitable manner of mounting the base member 32 is shown and includes two transverse bolts or rods 36 (seen best in FIG. 3) secured to the housing 22, said rods 36 extending through two slots 38 in the base member 32. The ends of the slots 38 act to limit the range of motion of the base member 32, the rear ends of the slots 38 in particular being important to limit the outward extension of the forward end of the base member 32. The arm members 28,30 must be small enough to slide under the rods 36 when telescoped together in their storage position.

A tension spring 40 is provided between the housing 22 and the base member 32 so as to bias the base member 32 toward extension of its forward end 34 from the case 20. Of course, the latch previously mentioned for holding the handle 25 flush with the end of the case 20 should be strong enough to maintain that position despite the biasing force of the tension spring 40. When the latch is released, the base member 32 is forced outward to its extended position, thereby facilitating quick conversion of the case 20 to a trolley as is described further below. The tension spring 40 maintains the base member 32 in its extended position when the case 20 is tipped during trolley use. The tension spring 40 also makes it easier to grasp the handle 25 for conversion to the trolley position, though other constructions, such as indentations in the side of the case 20, could also be used.

A wheel or caster 42 is also mounted near the forward end 34 of the base member 32. A pair of flanges 44 extend down from the base member 32 and support the axle 46 of the wheel 42. Even though the wheel 42 does not extend below the bottom of the case 20, the wheel 42 will nevertheless engage the ground for transport as will become apparent from the discussion further below. Wheel size is, of course, limited by space requirements but the maximum size wheel possible is preferable to provide advantageous operational characteristics over irregular surfaces. In order to accommodate for this, the housing 22 may have a small opening 48 at the bottom.

With the base member 32 extending outwardly as shown in FIG. 4, the handle 25 may be pulled to extend the arm members 28,30. Suitable means should be provided to prevent the arm members 28,30 from pulling apart.

The arm members 28,30 are maintained in their extended position by a detent spring 50. When it is desired to return the trolley mechanism to its storage position with the arm members 28,30 telescoped together, the detent spring 50 may be overcome by applying sufficient pressure to the handle 25 and thereby lowering the upper arm member 28 into the lower arm member 30.

A brace 52 is provided between the forward ends of the lower arm members 30 to strengthen the mechanism when extended to the trolley position. The brace 52 rests against the handle 25 when the upper and lower arm members 28,30 are telescoped together in the storage position so that it takes up only minimal space when stored.

The lower arm member 30 has first and second pins 54,56 protruding from opposite sides, each of said pins 54,56 sliding in longitudinal slots 58,60 in the base member 32. The first and second pins 54,56 are at the same height but are longitudinally misaligned so that the first pin 54 is a distance R in front of the second pin 56.

When the lower arm member 30 is fully extended, the first and second pins 54,56 are at the end of their respective longitudinal slots 58,60. The forward end 34 of the base member 32 comprises two forwardly extending flanges 61 on either side (as best seen in FIG. 5) and thus, without any limiting surface above, the lower arm member 30 may be pivoted up (counterclockwise) around the transverse axis 62 extending through the forward end of the first longitudinal slot 58. Accordingly, the first pin 54 rotates in place at the forward end of its longitudinal slot 58 while the second pin 56 sweeps through an arcuate slot 64 having a radius R equivalent to the offset R of the pins 54,56.

Once pivoted to an upright position, the lower arm member 30 is moved down with the first and second pins 54,56 sliding downward in their respective vertical slot portions 66,68. When moved downward, the rear end 70 of the lower arm member 30 drops below the bottom of the base member 32 as best seen in FIG. 6. The pin and slot construction described immediately above facilitates this operation since the second pin 56 when swept through the arcuate slot 64 maintains the first pin 54 at the forward end of its longitudinal slot 58. Otherwise, there would be a tendency for the first pin 54 to move back into the longitudinal slot 58, resulting in interference with the pivoting and/or the downward motion of the lower arm member 30.

Rather than being circular, the arcuate slot 64 could be provided with an increasing radius of curvature so that, when the lower arm member 30 is pivoted, the first pin 54 will both pivot and move down slightly into its vertical slot portion 66. With this configuration, when the lower arm member 30 is fully pivoted, it may easily be moved downward without resistance from the first pin 54 inasmuch as the pin 54 will be partially in its vertical slot portion 64 and away from the longitudinal slot 58 which could otherwise interfere with the desired motion of the arm members 30. This design accordingly provides even greater assurance of interference free operation than does a perfectly circular arcuate slot 64.

A short forwardly extending slot portion 72 is also provided on both sides so that when the arms 27 are tilted forward, the lower arm member 30 is pivoted forward as indicated in FIG. 6. This enables the handle 25 to be lifted, as when the mechanism is being pulled over a curb, without accidentally pulling up the lower arm member 30 into an unlocked position.

Figure 16:
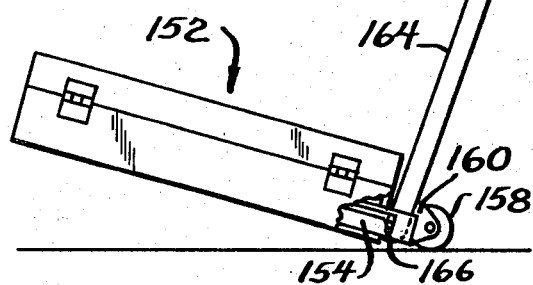

In the trolley position shown in FIG. 6, when the handle 25 is tilted forward as indicated by the arrow, the rear end 70 of the lower arm member 30 will engage the bottom forward edge 74 of the base member 32. Such engagement prevents the base member 32 from tilting with respect to the lower arm member 30. The base member 32 and lower arm member 30 should be, as shown in FIGS. 6, 8 and 16, at approximately right angles to one another, and at least at an angle greater than 30°. Thus, the base member 32 along with the case 20 tips upward when the arms 27 are tilted forward and the entire assembly rests on the wheels 42. Other luggage stacked on top of the case 20 can easily be transported therewith.

Note that when the mechanism is in the trolley position with the case 20 resting on the ground, the arms nevertheless lean slightly forward. This enables the weight of the arm members 28,30 and handle 25 to create a clockwise pivoting moment around the rear end 70 of the lower arm members 30, which moment tends to hold the arms 27 in their trolley position.

The concept involved with the above-described pin and slot construction for pivoting and locking the arms in the trolley position would also apply to a construction where the components are reversed; that is, where the pin is on the base member and the longitudinal slot is in the lower arm member. With such a configuration, the pin protrudes inwardly from the flanges of the base member and the longitudinal slot slides past the pin when the lower arm member is pulled out. When fully extended, the arm member pivots at the end of its slot around the pin. The arm member can then be moved downwardly to lock in its trolley position as described above, the downward motion being limited either by the length of a second slot angled backward and slightly offset from the longitudinal slot or by the resting of a portion of the rear of the arm member on a plate between the flanges at their forward end. This construction is not preferred however because the slot in the lower arm member would collect dirt when extended and would not be as attractive as the arm members of the preferred construction.

A second embodiment of this invention is shown in FIGS. 7–12 where the trolley arms are mounted along the short sides of the case 100. An additional piece of luggage 101 is shown stacked on the case 100 in FIG. 8 for transport. Additional luggage could similarly be stacked on top of this luggage piece 101.

In order to provide sufficient overall arm length for convenient operation as a trolley, this embodiment requires more telescoping arm members than the two arm members 28,30 disclosed in the first embodiment described immediately above. Four such arm members are indicated in the figures, those being a lower arm member 102, intermediate arm members 104,106 and an upper arm member 108. A handle 110 is provided between the upper arm members 108. The handle 110 may be offset as shown in order to avoid the case locks 112 and handle 114 which are mounted to the side of the case 100 across which the trolley handle 110 extends.

As with the first described embodiment, suitable means should be provided for the detent locking of the arm members 102–108, to maintain them in their extended position. Other suitable means should be provided to prevent the arm members 102–108 from being pulled apart.

The embodiment shown in FIGS. 7–12 has a unitary construction of its trolley mechanism. By that it is meant that the mechanism has two base pieces, one being the base housing 116 mounted to remain stationary within the case 100 and the other being a reciprocating base member 118 which may slide in and out of the base housing 116. The reciprocating base member 118 corresponds to the base member 32 of the first described embodiment.

The reciprocating base member 118 is slidable between a stored position (FIG. 9) and an extended position (FIG. 10). The forward extension of the reciprocating base member 118 is limited by the engagement of stops 120,122 on the base housing 116 and base member 118 respectively. When used as a trolley as shown in FIG. 8, the case 100 is actually biased by gravity toward sliding over the base member 118 to return the base member 118 to the stored position. If a tension spring is not provided as described with the first embodiment, this motion is normally prevented by the frictional forces induced by the additional luggage stacked on top and, in any event, the motion is limited by the engagement of the end of the case 100 with the lower arm members 102.

The base member 118 has a longitudinal slot 124 on both sides substantially halfway between its top and bottom. A pin 126 at the rear end of the lower arm member 102 mounts a wheel 128 between the sides of the lower arm member 102. The pin 126 also extends out the sides of the lower arm member 102 and slides in the longitudinal slots 124 to help guide the lower arm member 102.

The base housing 116 may have channels 130 as shown on opposite sides in which the pin 126 slides. Raised channels 131 are also located on the top and bottom of the base member 118. The wheel 128 extends into the channels 131 while the shoulders of the channels 131 engage the corners of the lower arm member 102 to provide for proper telescoping.

With the wheel 128 enclosed within the lower arm member 102, it is necessary that the intermediate and top arm members 104–108 be shorter than the lower arm member 102. This prevents the intermediate and top arm members 104–108 from interfering with the wheel 128 when all of the arm members 102–108 nest together in the storage position.

The forward end of the base member 118 includes two side flanges 132. The side flanges 132 have slots 134 extending downwardly from the forward end of the longitudinal slots 124. Note that although it is preferred that identical slots be used on both sides of the base member 118, it is actually only necessary that the pin 126 extend on one side with a longitudinal slot 124 on only one side of the base member 118.

When the lower arm member 102 is fully extended as shown in FIG. 10, it may be pivoted upward and dropped down as indicated by the arrows in FIG. 12. This pivoting is similar to that in the first described embodiment except that both slots are identical so that, during pivoting, the pin 126 rotates at the forward end of the longitudinal slot 134 on both sides.

When the lower arm member 102 is dropped down, the wheel 128 projects downwardly below even the level of the bottom of the case 100. Further, in this position, the sides at the rear end 136 of the lower arm member 102 engage a reinforced segment 138 mounted to the bottom of the base member 118. This engagement does not occur across the entire width of the base member 118 since there is a slot in the middle of the reinforced segment 138. The wheel 128 extends into the slot when in the trolley position, the slot thus enabling the maximum size wheel to be used.

A notch 140 is also provided at the rear end 136 of the lower arm member 102. The notch 140 will prevent the lower arm member 102 from unlocking when the handle 110 is lifted when, for example, the trolley is being moved over a curb. This notch 140 may be provided in lieu of the short forwardly extending slot portion 72 disclosed with the first described embodiment.

Suitable detent means 142,144 are also provided on the lower arm member 102 and the base member 118 respectively, which detent means 142,144 engage one another when the lower arm member 102 is in its trolley position. Said detent means 142,144 also aid in keeping the lower arm member 102 locked in its trolley position. In addition, the arms of this embodiment also tilt forward slightly to maintain the arms locked in the trolley position when the case 100 is resting on the ground.

A third embodiment of this invention showing still other variations is shown in FIGS. 13–16.

Figure 14:
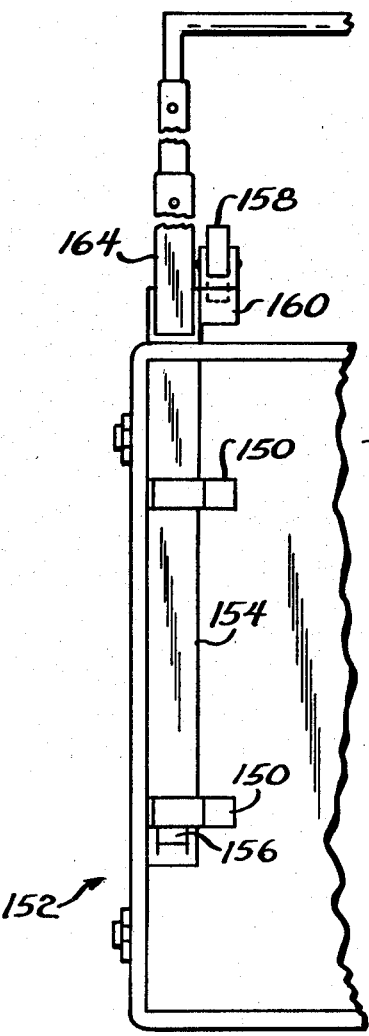

With this embodiment, brackets 150 are secured to the sides of the case 152 as best seen in FIG. 14. A base member 154 may slide through the brackets 150 to reciprocate its forward end into and out of the case 152. A raised stop 156 is mounted on the rear of the base member 154, which stop 156 engages the rear bracket 150 to limit the forward motion.

The wheel 158 and its mounting bracket 160 are mounted to the side of the base member 154. Such a wheel mounting enables a large diameter wheel to be used. Further, with the wheel 158 projecting forwardly, there is no danger of any portion of the base member 154 digging into the ground during use as a trolley in the event that the mechanism is tipped forward excessively. However, such mounting does have a drawback in that it takes up more space than the other described wheel mountings.

Figure 15:
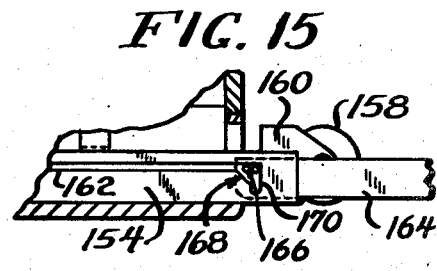

Finally, still another type of pin and slot construction is shown to lock the arms in the trolley position. This construction entails a longitudinal slot 162 on only one side of each base member 154. The lower arm member 164 has a longitudinally aligned projection 166 which slides in said slot 162. As easy way to provide such a projection 166 is through the use of two pins side-by-side as shown in FIGS. 15 and 16. At the forward end of the longitudinal slot 162 is an arcuate cut-out 168. When the lower arm member 164 is fully extended, it may be pivoted and lowered as with the previously described embodiments with the projection 166 first sweeping through an arc in the cut-out 168 and then lowering into a bottom slot 170, thereby locking the base member 154 and lower arm member 164 in a manner similar to the previously described embodiments.

Other features, though not shown in the figures, could be added to any of the above-described cases. The trolley mechanism could be detachably mounted to the case, enabling the entire mechanism to be removed from the case when the owner is sure that he will not require the use of a trolley. Removal of the mechanism thus reduces the weight of the case which may then more easily be carried in its normal mode. Further, straps could be used to help secure luggage stacked on top of the case when it is used as a trolley.

Still other variations of the embodiments described in detail above are apparent. For example, rather than locking the lower arm members with respect to the base members by one of the pin and slot combinations described, latches can be provided on the side of the case to secure to the lower arm members when they are folded up to the trolley position. This would ensure that the case be maintained relatively perpendicular to the lower arm members. Further, although it is preferred that the base member be the largest member with the arm members nesting within it, it is possible to have its base member nesting within the arm members where the upper arm member is largest in size.

Other aspects, objects and advantages of this invention should be apparent from the specification, drawings and appended claims.

We claim:

1. A portable case having top and bottom surfaces, two sides, a forward end, and a rear end defining an interior, and capable of being converted into a trolley, comprising:
    first and second arm means, each having nesting first and second members, said first members being mounted on opposite sides of said case and each being capable of extending a forward end beyond the forward end of said case;

a handle extending between said second members;

means for mounting said second members for pivoting with respect to said first members when said second members are extended;

means for locking said second members at an angle greater than 30° to said first members;

wheel means; and means for supporting said wheel means outside of said case near the forward end of said first members when said second members are pivoted and locked.

2. The portable case of claim 1, further comprising:

spring means for biasing the forward ends of said first members beyond said end of said case; and means for locking the forward ends of said first members in said case.

3. The portable case of claim 1, further comprising first and second rods fixed to said case and within channels in said first members of said first and second arm means respectively to limit the extension of said first members.

4. The portable case of claim 1, further comprising housing means for enclosing said first and second arm means separately from the interior of said case.

5. The portable case of claim 1, wherein said second members each include at least two arm components longitudinally slidable in relation to one another.

6. The portable case of claim 5, further comprising means for locking said arm components in an extended position relative to one another.

7. The portable case of claim 1, wherein said wheel means are mounted to the rear end of said second members.

8. The portable case of claim 1, wherein said locking means comprise means for locking said second members against the end of said case.

9. The portable case of claim 1, wherein said second members are telescopically received within said first members.

10. The portable case of claim 9, wherein said means for pivoting and said means for locking said second member comprise with each of said arm means:

flanges extending longitudinally from the sides at the forward end of said first member;

a first longitudinal slot in said first member having a forward end extending forwardly into one of said flanges;

a projection on said second member, said projection being slidable within said first longitudinal slot;

a first downwardly extending slot beginning at the forward end of said first longitudinal slot;

wherein said second member may be pivoted upward around said projection when at the forward end of said first longitudinal slot and, once pivoted upward, said second member may be moved downward with its projection in said first downwardly extending slot whereby said second member engages the bottom of the end of said first member to lock said second member against pivoting downward with respect to said first member.

11. The portable case of claim 10, further comprising a notch on said second member so that a portion of said second member extends beneath said first member when said first and second members are locked.

12. The portable case of claim 10, further comprising:

a second longitudinal slot on the opposite side of said first member;

a second projection on said second member, said second projection being slidable within said second longitudinal slot; and a second downwardly extending slot beginning at the forward end of said second longitudinal slot.

13. The portable case of claim 12, wherein said first and second downwardly extending slots are identical.

14. The portable case of claim 12, wherein:

said first downwardly extending slot is linear;

said second downwardly extending slot has an arcuate portion centered on a transverse axis extending through the forward end of said first longitudinal slot, said second downwardly extending slot further having a linear portion extending downwardly from the lower end of said arcuate portion; and said second projection is longitudinally offset behind said first projection a distance equivalent to the radius of said arcuate portion.

15. The portable case of claim 12, wherein said downwardly extending slots include longitudinally extending slot portions at their lower ends.

16. The portable case of claim 10, wherein:

said projection is oblong and longitudinally aligned; and said downwardly extending slot includes an arcuate cut-out centered on the end of said longitudinal slot whereby said projection may sweep through an arc within said cut-out while the forward end of said projection pivots at the forward end of said longitudinal slot.

17. A portable case capable of being converted into a trolley, comprising:

first and second base members mounted to opposite sides of said case and having forward ends capable of being reciprocated into and out of said case;

first and second lower arm members telescopically received within said first and second base members respectively;

first and second upper arm members telescopically received within said first and second lower arm members respectively;

a handle between said first and second upper arm members;

means for limiting the extension of said lower arm members from said base members;

means for permitting upward pivoting of said lower arm members with respect to said base members when fully extended therefrom;

means for locking said lower arm members in a pivoted position;

a pair of wheel members; and means for supporting said wheel members near the forward ends of said base members when said lower arm members are pivoted.

18. The portable case of claim 17, further comprising intermediate arm members telescopically received within said lower arm members and telescopically receiving said upper arm members.

19. The portable case of claim 17, further comprising:

spring means for biasing the forward ends of said base members beyond the end of said case; and means for locking the forward end of said base members in said case.

20. The portable case of claim 17, wherein said wheel members are mounted to said first and second lower arm members respectively.

21. The portable case of claim 17, wherein said pivoting permitting means and said locking means comprise with both said first base member and said first upper and lower arm members, and said second base member and said second upper and lower arm members, respectively:

flanges extending longitudinally from the sides at the forward end of said base member;

a first longitudinal slot in the side of said base member having a forward end extending into one of said flanges;

a pin on said lower arm member, said pin being slidable within said first longitudinal slot;

a first downwardly extending slot beginning at the forward end of said first longitudinal slot;

wherein the engagement of said pin with the forward end of said longitudinal slot limits extension of said lower arm member from said base member, and said lower arm member may be pivoted upwardly between said flanges around said pin and, once pivoted, said lower arm member may be moved downward with its pin in said first downwardly extending slot, whereby downward pivoting is thereafter prevented by the engagement of said lower arm member with the bottom of the forward end of said base member.

22. The portable case of claim 21, further comprising a notch on said lower arm member so that a portion of said lower arm member extends beneath said base member when said lower arm member and said base member are locked with respect to one another.

23. The portable case of claim 21, further comprising:
a second longitudinal slot on the opposite side of said base member;
a second pin on said lower arm member, said second pin being slidable within said second longitudinal slot; and
a second downwardly extending slot beginning at the forward end of said second longitudinal slot.

24. A portable case capable of being converted into a trolley, comprising:
a base member having an arm member associated therewith, said base member being mounted within the case and capable of extending a forward end beyond a side of the case;
a pin and slot combination, the slot extending generally longitudinally along either the base member or the arm member respectively and the pin projecting from either the arm member or the base member respectively and slidably received within the slot, said pin and slot combination permitting extension of the arm member with respect to the base member and further permitting the pivoting of the arm member with respect to the base member around the pin when the arm member is extended to thereby position the arm member for supporting additional material thereon when used as a trolley; and
means for locking said arm member in a pivoted position.

25. The portable case of claim 24, wherein the arm member nests within the base member, the base member being open at the top at least along the forward end, and the slot being located on the base member and ending at the forward end of the base member with the pin being located on the arm member and engaging the end of the slot when the arm member is fully extended, and the pin further acting as a pivot point for pivoting of the arm member upward through the open top of the base member.

26. The portable case of claim 25, wherein the locking means includes an opening at the forward end of the base member and a downwardly extending portion at said forward end of said slot to allow the arm member when pivoted upward to be moved downward as the pin is moved in the downwardly extending slot portion until the arm member engages the bottom of the base member contiguous to its forward end to thereby prevent said arm member from being pivoted downwardly.

27. The portable case of claim 26, further comprising a second slot on the opposite side of the base member, said second slot also ending at the forward end of the base member and having a downwardly extending slot portion at the forward end, and a second pin on the arm member slidable within the second slot.

28. The portable case of claim 27, wherein the downwardly extending slot portions of both of said slots are asymmetric.

29. The portable case of claim 27, wherein the downwardly extending slot portion of the first slot is substantially straight and the downwardly extending slot portion of the second slot includes an arcuate portion having a substantially straight portion at its lower end.

30. The portable case of claim 29, wherein the second pin is longitudinally offset on the arm member from the first pin.

31. A portable case capable of being converted into a trolley, comprising:
first and second base members mounted to opposite sides of said case and capable of having their forward ends reciprocated into and out of said case;
first and second arm members telescopically received within said first and second base members respectively;
a handle between said first and second arm members;
a pair of wheel members;
means for supporting said wheel members near the forward ends of said base members when said arm members are pivoted; and
with both said first base member and said first arm member, and said second base member and said second arm member, respectively:
flanges extending longitudinally from the sides at the forward end of said base member;
a first longitudinal slot in the side of said base member and extending into one of said flanges;
a pin on said arm member, said pin being slidable within said first longitudinal slot;
a first downwardly extending slot beginning at the forward end of said first longitudinal slot;
wherein said arm member may be pivoted upwardly between said flanges around said pin and, once pivoted, said lower arm member may be moved downward with its pin in said first downwardly extending slot, downward pivoting being thereafter prevented by the engagement of said arm member with the bottom of the forward end of said base member.

* * * * *